United States Patent
Streltsov et al.

(10) Patent No.: US 10,954,160 B2
(45) Date of Patent: Mar. 23, 2021

(54) LASER WELDING TRANSPARENT GLASS PANES USING A LOW EMISSIVITY COATING

(71) Applicant: Corning Incorporated, Corning, NY (US)

(72) Inventors: Alexander Mikhailovich Streltsov, Corning, NY (US); John Christopher Thomas, Elmira, NY (US)

(73) Assignee: Corning Incorporated, Corning, NY (US)

( * ) Notice: Subject to any disclaimer, the term of this patent is extended or adjusted under 35 U.S.C. 154(b) by 202 days.

(21) Appl. No.: 15/780,109

(22) PCT Filed: Nov. 29, 2016

(86) PCT No.: PCT/US2016/063936
§ 371 (c)(1),
(2) Date: May 30, 2018

(87) PCT Pub. No.: WO2017/095784
PCT Pub. Date: Jun. 8, 2017

(65) Prior Publication Data
US 2018/0362400 A1    Dec. 20, 2018

Related U.S. Application Data

(60) Provisional application No. 62/260,802, filed on Nov. 30, 2015.

(51) Int. Cl.
*C03C 27/06* (2006.01)
*C03C 17/36* (2006.01)
(Continued)

(52) U.S. Cl.
CPC .............. *C03C 27/06* (2013.01); *C03C 17/36* (2013.01); *C03C 17/366* (2013.01);
(Continued)

(58) Field of Classification Search
CPC .. E06B 3/6612; E06B 3/6608; E06B 3/67334; E06B 3/66304; Y02B 80/22; Y02B 80/24; Y02A 30/25; Y02A 30/249
See application file for complete search history.

(56) References Cited

U.S. PATENT DOCUMENTS

| 8,679,599 B2 | 3/2014 | Grzybowski et al. |
| 2005/0013892 A1 | 1/2005 | Downs et al. |

(Continued)

FOREIGN PATENT DOCUMENTS

| JP | 2003-321255 A | 11/2003 |
| JP | 2007-106668 A | 4/2007 |

(Continued)

OTHER PUBLICATIONS

International Search Report and Written Opinion of the International Searching Authority; PCT/US2016/063936; dated Feb. 20, 2017; 13 Pages; European Patent Office.

(Continued)

*Primary Examiner* — Donald J Loney
(74) *Attorney, Agent, or Firm* — Irene L. Brookins; Svetlana Z. Short

(57) ABSTRACT

A sealed article and methods of making the same. The sealed article includes a first and second glass pane. The first and second glass panes include inner surfaces opposite outer surfaces and at least one outer edge. The second glass pane is spaced apart from and positioned substantially parallel to the first glass pane with a low emissivity layer there between. An seal is formed between the first and second glass panes contiguous the low emissivity layer.

17 Claims, 16 Drawing Sheets

(51) Int. Cl.
  *C03C 23/00* (2006.01)
  *E06B 3/673* (2006.01)
  *E06B 3/66* (2006.01)
  *C03C 27/10* (2006.01)
  *E06B 3/663* (2006.01)

(52) U.S. Cl.
  CPC ........ *C03C 23/002* (2013.01); *C03C 23/0025* (2013.01); *C03C 27/10* (2013.01); *E06B 3/6608* (2013.01); *E06B 3/6612* (2013.01); *E06B 3/66304* (2013.01); *E06B 3/67334* (2013.01); *C03C 2217/211* (2013.01); *C03C 2217/212* (2013.01); *C03C 2217/213* (2013.01); *C03C 2217/214* (2013.01); *C03C 2217/216* (2013.01); *C03C 2217/251* (2013.01); *Y02A 30/249* (2018.01); *Y02B 80/22* (2013.01)

(56) References Cited

U.S. PATENT DOCUMENTS

| | | | |
|---|---|---|---|
| 2012/0111059 A1* | 5/2012 | Watanabe | H01J 11/48 65/43 |
| 2012/0247063 A1 | 10/2012 | Grzybowski et al. | |
| 2014/0186557 A1 | 7/2014 | Grzybowski et al. | |
| 2015/0027168 A1 | 1/2015 | Dabich, II et al. | |
| 2017/0022100 A1 | 1/2017 | Masters et al. | |
| 2017/0153389 A1 | 6/2017 | Chen et al. | |

FOREIGN PATENT DOCUMENTS

| | | |
|---|---|---|
| JP | 2014-514233 A | 6/2014 |
| WO | 2012134818 A1 | 10/2012 |
| WO | 2013008724 A1 | 1/2013 |
| WO | 2015/083770 A1 | 6/2015 |
| WO | 2018075868 A1 | 4/2018 |

OTHER PUBLICATIONS

Kim et al; "Vacuum Insulated Glass Units and Methodology for Manufacturing the Same"; filed as U.S. Appl. No. 15/336,879 Oct. 28, 2016; 29 Pages.

Japanese Patent Application No. 2018-527889, Office Action dated Sep. 25, 2020, 22 pages (11 pages of English Translation and 11 pages of Original Document); Japanese Patent Office.

* cited by examiner

FIG. 1
FIG. 2
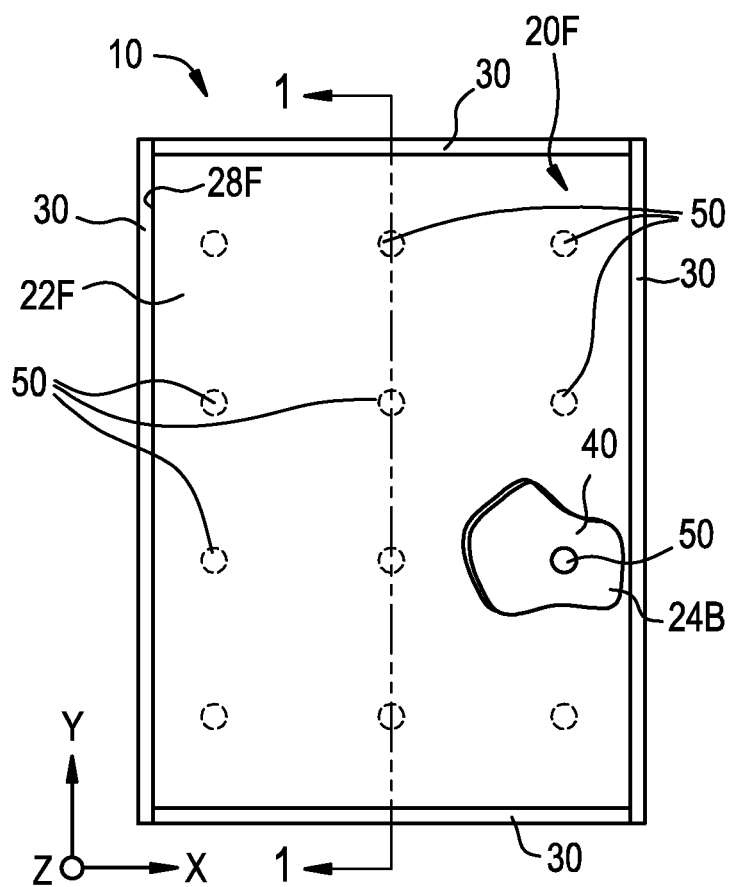
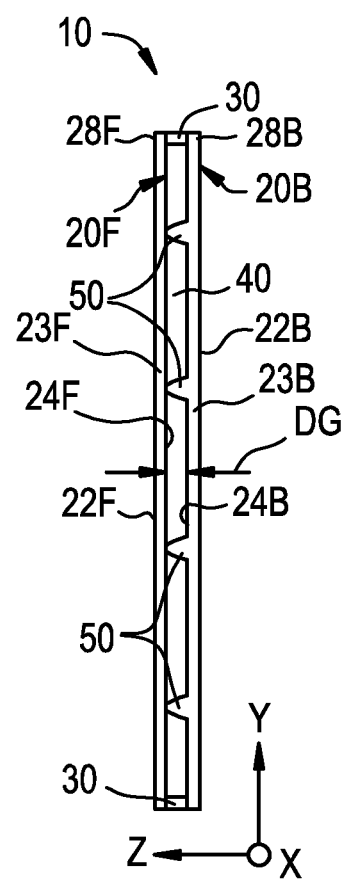
FIG. 3
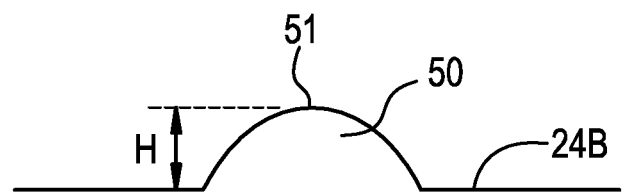

LASER WELDING TRANSPARENT GLASS PANES USING A LOW EMISSIVITY COATING

CROSS-REFERENCE TO RELATED APPLICATIONS

This application claims the benefit of priority under 35 U.S.C § 365 of International Patent Application Serial No. PCT/US2016/063936 filed on Nov. 29, 2016 designating the United States of America, the content of which is relied upon and incorporated herein by, reference in its entirety, which in turn claims the benefit of priority under 35 U.S.C. § 119 of U.S. Provisional Application Ser. No. 62/260,802 filed on Nov. 30, 2015, the content of which is relied upon and incorporated herein by reference in its entirety.

BACKGROUND

Field

The present disclosure relates generally to laser welding transparent glass panes in a vacuum insulated glass (VIG) window using a low emissivity (low-e) coating.

Technical Background

Vacuum-insulated glass (VIG) windows typically include two or more glass panes with an evacuated space (i.e., vacuum) located between the panes. The overall construction provides improved thermal and noise insulating properties compared to ordinary glass windows. To prevent sagging and contact between adjacent glass panes, discrete spacers can be placed between adjacent glass panes. The spacers can be made of aluminum, plastic, ceramic, or glass and are conventionally distinct from the glass panes, i.e., they are separate, discrete elements disposed and fixed between the glass panes. To create the evacuated space between the panes, an edge seal between the two or more panes is required that can hold a vacuum within the space and withstand the shearing forces caused by the thermal expansion of the two or more panes.

Accordingly, a need exists for alternative methods for sealing the edge of glass panes around the evacuated space in a VIG window.

SUMMARY

According to one embodiment of the present disclosure a sealed article is disclosed. The article may comprise a first glass pane, a second glass pane, a low emissivity layer, and an edge seal. In embodiments, the first and second glass panes each are formed from a glass material with an inner surface opposite an outer surface, and an outer edge. In embodiments, the first glass pane is spaced apart from and positioned substantially parallel to the second glass pane such that the first and second inner surfaces face each other. In embodiments, the low emissivity layer is between the opposite inner surfaces of the first and second glass pane. In embodiments, the edge seal is contiguous the low emissivity layer and formed around and connecting at least part of the first and second outer edges so as to define a sealed interior region between the first and second glass panes.

According to another embodiment of the present disclosure a vacuum insulated glass (VIG) window is disclosed. The VIG window may comprise a first glass pane, a second glass pane, a low emissivity coating, a plurality of glass-bumps, and a laser-induced edge seal. In embodiments, the first and second glass panes each are formed from a glass material with an inner surface opposite an outer surface, and an outer edge. In embodiments, the first glass pane is spaced apart from and positioned substantially parallel to the second glass pane. The low emissivity coating may be located on the inner surface of the second glass pane. The plurality of glass-bumps may be formed on the inner surface of the first glass pane from the first glass material. In embodiments, the laser-induced edge seal is contiguous the low emissivity layer formed around at least respective portions of the first and second outer edges so as to define a sealed interior region between the first and second glass panes. In exemplary embodiments, the plurality of laser-formed glass-bumps on the first inner surface of the first glass pane contact the low emissivity coating on the second inner surface of the second glass pane.

According to yet another embodiment of the present disclosure a method for making a VIG window is disclosed. In embodiments, the method includes irradiating a first glass pane with laser radiation to form a plurality of glass-bumps on a first inner surface of the first glass pane. In embodiments, the method also includes arranging the first inner surface of the first glass pane adjacent and substantially parallel to a second inner surface of a second glass pane. The first and second glass panes each are formed from a glass material with inner surfaces opposite outer surfaces, and outer edges. The inner surface of the second glass pane may include a low emissivity coating. In embodiments, the method includes bonding the first and second glass panes to create a sealed interior region between the first and second glass panes. The plurality of glass-bumps on a first glass pane may contact the low emissivity coating on the second glass pane within the sealed interior region.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings.

FIG. 1 is a front-on view of an example two-pane VIG window according to an exemplary embodiment.

FIG. 2 is a cross-sectional view of the VIG window of FIG. 1 as viewed in the direction 1-1.

FIG. 3 is a close-up cross-sectional view of an example glass-bump spacer.

DETAILED DESCRIPTION

Figure 4A:
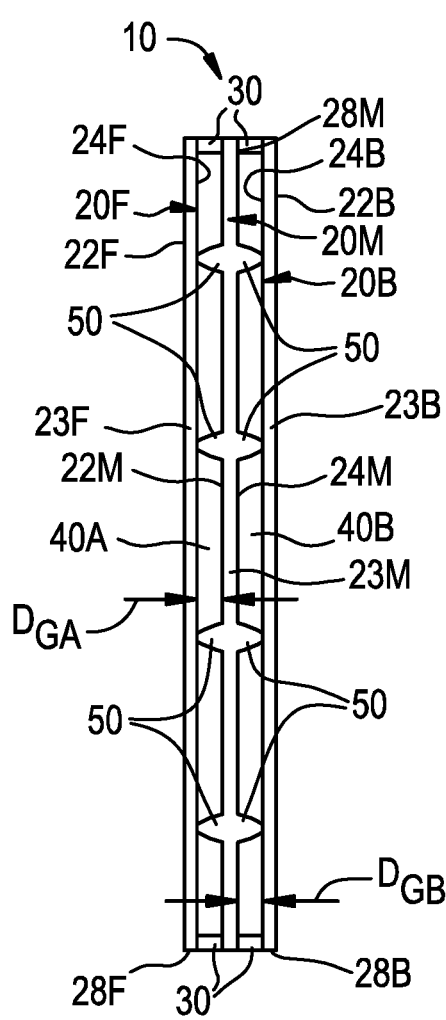
FIG. 4A is a cross-sectional view similar to FIG. 2 and that illustrates an example embodiment of a three-pane VIG window having a middle glass pane with glass-bump spacers formed in both surfaces of the middle pane.

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

The article of the present disclosure may be a sealed glass package for an organic light emitting diode (OLED), semiconductor packages, a VIG window 10, a quantum dot chiplet, a microfluidic device, or other applications requiring hermetic glass structures sealed together using absorbing thin films.

FIG. 1 is a front-on view of an example embodiment of a VIG window 10. VIG window 10 may contain two panes or three panes. In one embodiment, VIG window 10 includes a first glass pane spaced apart from and positioned substantially parallel to a second glass pane. The first and second glass panes each include an inner surface opposite an outer surface. The first and second glass panes also each include at least one outer edge. The first and second glass panes are made from a glass material. In other embodiments, VIG window 10 may include a third glass pane including an inner surface opposite an outer surface, and at least one outer edge. Third glass pane is also formed from a glass material. The third glass pane may be positioned between and substantially parallel the first and second glass pane, or opposite the outside surface of either the first or second glass pane.

FIG. 2 is a cross-sectional view of the example two-pane VIG window 10 of FIG. 1 as viewed in the direction 1-1. Cartesian coordinates are shown for reference. VIG window 10 includes a front glass pane 20F and a back glass pane 20B disposed opposite to and substantially parallel to one another. In embodiments, front glass pane 20F may be configured to be the outside glass pane when VIG window 10 is installed on a structure (e.g., building). Front glass pane 20F has a body portion 23F made of a first glass material and has outer and inner surfaces 22F and 24F and an outer edge 28F. Likewise, back glass pane 20B has a body portion 23B made of a second glass material and has outer and inner surfaces 22B and 24B and an outer edge 28B. In an example embodiment, the first and second glass materials making up body portions 23F and 23B are the same. In a further example embodiment, either or both of the first and second glass materials making up body portions 23F and 23B can comprise chemically-strengthened glass, tempered glass, or an ion-exchanged glass. Examples of glass compositions and strengthening techniques are provided in U.S. Pat. No. 8,679,599 the entire content of which is incorporated by reference herein. Front and back glass panes 20F and 20B are separated by a distance DG as measured from their respective inner surfaces 24F and 24B.

VIG window may include a low emissivity layer 25 between inner surfaces 24F and 24B of front glass pane 20F and back glass pane 20B. Glass panes 20F and 20B and low emissivity layer 25 together may have a combined transmission of up to 70%, or even up to 80%, at wavelengths from about 450 nm to about 625 nm. Low emissivity layer 25 may be deposited onto surfaces of front glass pane 20F or back glass pane 20B by physical vapor deposition, pyrolysis, sputtering, 3-D printing, or by other conventional methods. In an exemplary embodiment, VIG window 10 in FIG. 2 includes low emissivity layer 25 on surface 24F (not shown).

Low emissivity layer 25 may also be a coating formed from a plurality of layers. For example, the low emissivity coating may include an infrared-reflecting layer and one or more transparent inorganic layers. The infrared-reflecting layer and one or more transparent inorganic layers may be arranged in any configuration including several alternative layers of each. The infrared-reflecting layer may include a conductive metal such as silver, gold, copper, and combinations thereof, that reduces the transmission of heat through the coated pane. The inorganic layer within the low emissivity coating can be used for reflecting infrared (IR) and near-infrared (NIR) light and to control other properties and characteristics of the coating, such as color and durability. Inorganic materials include metal oxides including oxides of zinc, tin, aluminum, indium, bismuth, and titanium, among others. The inorganic layer of low emissivity layer 25 may include $SiO_2$, $Al_2O_3$, $ZnO$, $TiO_2$, $SnO_2$, and combinations thereof. In an exemplary embodiment, the top of low emissivity layer 25 may include a durability composition including oxides of silicon, aluminum (e.g., $SiO_2$ and $Al_2O_3$), and combinations thereof. Commercially available low-e coatings from Cardinal IG Company, Guardian Industries, etc. are in accordance with the present disclosure.

Example low emissivity coatings include one or two, or even three to four metal layers (e.g., silver, gold, aluminum, copper, etc.) each sandwiched between layers of a transparent inorganic material. Increasing the number of metal layers can increase the total infrared reflection, although additional metal layers can also reduce the visible transmission through the window and/or negatively impact the coating's color or durability. Example low emissivity coatings of the present disclosure have a thickness from about 1 nm to about 1 micrometer, or from about 50 nm to about 500 nm. Individual layers of the low emissivity coating may have a thickness from hundreds of nanometers to tens of microns. Low emissivity layer 25 of the present disclosure may reflect infrared (IR) and near-infrared (NIR) sunlight wavelengths. In embodiments, low emissivity coating may transmit ≤20% of NIR and IR wavelengths, or even ≤5% of NIR and IR wavelengths contacting low emissivity layer 25. That is, low emissivity coating may transmit ≥1% and ≤20% of NIR and IR wavelengths. In embodiments, low emissivity layer 25 may reflect sunlight wavelengths between about 700 nm and about 2,000 nm. In embodiments, low emissivity layer 25 is transmissive for wavelengths at about 420 nm to about 750 nm.

VIG window 10 further includes spacers 50. In embodiments, spacers 50 are a plurality of glass-bump spacers 50 integrally formed in inner surface 24B of back glass pane 20B. Glass-bump spacers 50 may also be formed on inner surface 24F of from glass pane 20F. FIG. 3 is a close-up view of an example glass-bump spacer 50. Note that glass-bump spacers 50 are integrally formed in back glass pane 20B and are not added as separate or discrete elements to VIG window 10. Thus, glass-bumps 50 are formed from (and thus consist of) the same material as back glass pane 20B, and in fact are extensions of body portion 23B. Example methods of forming glass-bumps 50 (including by laser-induced radiation) are discussed in U.S. Pat. No. 8,679,599 the entire content of which is incorporate by reference herein. Example methods of etching glass-bumps 50 from glass pane 20B, for example, are provided in U.S. Patent Application No. 62/248,715 entitled "VACUUM INSULATED GLASS UNITS AND METHODOLOGY FOR MANUFACTURING THE SAME" the entire content of which is incorporated by reference herein. Surface 24B of back glass pane 20B including glass-bump spacers 50 may also include low emissivity coating 25 thereon. This may be in addition (or alternative) to low emissivity coating 50 on surface 24F of front glass pane 20F. Spacers 50 may also be discrete metal, ceramic, aluminum, plastic, or glass spacers between panes 20B and 20F.

In an example embodiment, spacers 50 are regularly spaced with respect to one another. Because glass-bump spacers 50 may be integrally formed in body portion 23B, they are substantially invisible when the VIG window 10 is viewed at regular (i.e., substantially normally incident) viewing angles. Consequently, glass-bumps 50 are shown in phantom (dotted lines) in FIG. 1. Glass-bump 50 has a "tip" or "top portion" 51, as shown in FIG. 3. As discussed below, top portion 51 need not be rounded as is shown in FIG. 3. For example, top portion 51 may have a large radius of curvature or even a flat top portion. Glass-bump geometries according to the present disclosure are provided in U.S. patent application Ser. No. 14/808,790 entitled "GLASS BUMPS ON GLASS ARTICLES AND METHODS OF LASER-INDUCED GROWTH" and U.S. Patent Application No. 62/410,466 entitled "DIMPLED GLASS BUMPS ON GLASS ARTICLES AND METHODS OF FORMING THE SAME" the entire content of which are incorporated by reference herein. Spacers 50 may contact front pane inner surface 24F and serve to maintain the separation distance DG between front and back glass panes 20F and 20B.

In an exemplary embodiment, spacers 50 contact low emissivity layer 25 on pane inner surface 24F. During assembly, VIG window 10 may be heated to between about 350° C. to about 450° C. to remove inorganics from the sealed interior region or to cure glass frit acting as edge seal 30, or both. Accordingly, low emissivity layer 25 may prevent spacers 50 (especially glass-bump spacers) from adhering to pane inner surface 24F during this process.

After assembly, front glass pane 20F and back glass pane 20B may be substantially locked in position with respect to one another by the sealed edge around VIG window 10. Thermal expansion of the opposing panes can cause the glass-bump spacers 50 contacting pane inner surface 24F to move and drag across inner surface 24F. With force from about 40 N to about 160 N, or as much as 200 N of force, between a glass-bump spacer 50 and an opposing glass pane surface, lateral movement of glass-bump 50 along a glass pane surface may cause damage to the glass-bump or glass surface and ultimate failure of VIG window 10. During thermal expansion in a conventional VIG window, the static coefficient of friction (CoF) between top portion 51 of glass-bump 50 and a surface of a glass pane for a load of about 40N to about 160 N (the load substantially orthogonal to the glass pane surface) can be from about 0.8 to 1.0, or even higher. Low emissivity layer 25 may act as a low frictive coating to prevent glass-bump spacers 50 from damaging to pane inner surface 24F, or visa versa, during thermal expansion of VIG window 10 opposing panes. That is, low emissivity layer 25 may reduce friction between the plurality of glass-bumps 50 and the opposed, contacted glass pane by about 50% to about 80%. The static CoF between top portion 51 of glass-bump 50 and a surface of glass for a load of about 40N to about 160 N (the load substantially orthogonal to the glass pane surface) separated by low emissivity layer 25 can be from about 0.1 to about 0.4, or even from about 0.2 to about 0.35.

In an example embodiment, glass panes 20F and 20B are formed from soda-lime glass, an alumino-borosilicate glass, an alkali aluminosilicate glass, borosilicate glass, Gorilla® Glass, which in a further example embodiment have a respective thickness TG between 0.5 mm and 5 mm (e.g., 0.5, 0.7, 1, 1.5, 2, 2.5, 3, 3.5, 4, 4.5 or 5 mm). While soda-lime glass is the most common window glass, VIG window 10 disclosed herein can be applied to any type of glass in which integral glass-bump spacers 50 can be formed using the methods described in detail below. For example, the VIG window disclosed herein applies to low-iron ("ultra-clear" or "ultra-white") window glasses, as well as to the other glasses introduced and discussed below. In embodiments, glass panes 20F and 20B are transmissive at 420 nm to 750 nm. In an example embodiment, glass-bump spacers 50 have a height ("bump height") H in the range from 50 µm to 300 µm, or from 75 µm to 150 µm, and or even from 100 µm to 120 µm. In an example embodiment, glass panes 20F and 20B have substantially the same thickness TG (see FIG. 6).

An edge seal 30 is provided at respective outer edges 28F and 28B between at least a portion of each outer edge to provide a hermetic seal. Edge seal 30 between front and back glass pane inner surfaces 24F and 24B define a sealed interior region 40. In embodiments, edge seal 30 is formed contiguous low emissivity layer 25 and is formed around at least part of outer edges 28F and 28B so as to define sealed interior region 40 between front and back glass panes 20F and 20B. In embodiments, the edge seal 30 is at least partially laser-induced. In an exemplary embodiment, VIG window 10 includes low emissivity layer 25 on surface 24F. Edge seal 30 may be a seal by glass frit, a seal directly between glass panes 20B and 20F, or a seal between glass panes 20B and 20F with a shim or glass segment there between.

To form edge seal 30, as shown in FIG. 5, surface 24B of glass pane 20B may be brought into contact with low emissivity layer 25 on surface 24F. A focused laser beam 501 from laser 500 can be used to locally heat and melt the low emissivity layer 25 adjacent the glass panes 20B and 20F to form a sealed interface. In one approach, the laser can be directed through the glass pane 20B or 20F and then translated (scanned) across the sealing surface to locally heat low emissivity layer 25. In embodiments, low emissivity layer 25 absorbs from about 10% to about 100% of laser radiation from laser beam 102 having a predetermined wavelength. In embodiments, absorption of at least 30% laser radiation from laser beam 102 with a predetermined wavelength by low emissivity layer 25 forms edge seal 30.

The laser 100 can have any suitable output (e.g., laser beam 102) to affect sealing at the interface of low emissivity layer 25. In exemplary embodiments, laser 100 has a laser beam 102 output with a wavelength predetermined by the composition of low emissivity layer 125 such that low emissivity layer 125 absorbs at least 30% of the output wavelength(s). An exemplary laser 100 can be a UV laser such as, but not limited to, a 355 nm laser, which lies in the range of transparency for common display glasses. In other embodiments, laser 100 can have a predetermined output laser radiation from about 100 nm to about 400 nm. A suitable laser power can range from about 1 W to about 10 W. The width $W_B$ of the sealed region, which can be proportional to the laser spot size, can be about 10 microns to about 2 mm, or about 10 microns to about 0.1 mm (1.00 microns), e.g., 0.06, 0.1, 0.2, 0.5, 1, 1.5 or 2 mm. A translation rate of the laser (i.e., sealing rate) can range from about 1 mm/sec to 400 mm/sec or even to 1 m/sec or greater, such as 1, 2, 5, 10, 20, 30, 50, 60, 100, 200, or 400 mm/sec, 600 mm/sec, 800 mm/sec, 1 m/sec. The laser spot size (diameter) can be about 0.001 to 2 mm.

In embodiments where glass pane surfaces 24B and 24F and low emissivity layer 25 cannot be brought into sufficient proximity to each other to form a laser-induced edge seal 30 (e.g., ≤1 micron apart), alternative embodiments of forming edge seal 30 are according to embodiments of the present disclosure. For example, glass-bump spacers 50 may have a height H that is too large for edge 28B to come within ≤1 micron of edge 28F. Accordingly, a glass shim or glass segment (e.g., glass gasket) may be placed between surfaces 24F and 24B to fill a gap 28 (shown in FIG. 5) between glass panes 20B and 20F. Gap 28 may have a height, for example, from about 2 microns to about 2 mm. In this embodiment, glass-bump spacers 50 are in contact with low emissivity layer 25 when the shim or glass segment fills gap 28. The glass shim or glass segment have also have a low emissivity layer 25 on one of its major surfaces facing surface 24F or opposite the surface contacting low emissivity layer 25 on surface 24B. That is, glass shim or glass segment may have a low emissivity layer 25 to effectuate sealing between itself and one or both of glass panes 20B or 20F. Example configurations of glass shim or glass segment between opposing glass panes and methods of sealing (including by laser-induced absorption) are provided in U.S. Patent Application No. 62/245,020 entitled "INTERLOCKED LASER SEALED GASKET FOR SEALED DEVICE" and U.S. Patent Application No. 62/260,754 entitled "SEALED DEVICE WITH SEALING GASKET COATED WITH LOW MELTING INORGANIC MATERIAL" the entire contents of which are incorporated by reference herein. The glass shim(s) or glass segment(s) are shown between opposing panes in FIGS. 2 and 4A-C. In an exemplary embodiment, edge seal 30 is created between glass panes 20B and 20F and the glass shim or glass segment there between in a single translation of laser beam 102 radiation through glass panes 20B and 20F and the glass shim or glass gasket. That is, laser beam 102 may locally heat and melt several layers of low emissivity coating to fuse several layers of glass pane edges in a single translation.

In another embodiment, glass-bump spacers 50 and edge 28B, for example, may be chemically etched out of glass pane 20B. In this embodiment, height H of glass-bump spacers 50 would have the same height as edge 28B from surface 24B of glass pane 20B. Accordingly, top portion 51 of glass-bump spacers 50 and edge 28B could be brought into contact with low emissivity layer 25 on surface 24F of glass pane 20F. Example methods of forming the etched structures described above in a glass pane are provided in U.S. Patent Application No. 62/248,715 entitled "VACUUM INSULATED GLASS UNITS AND METHODOLOGY FOR MANUFACTURING THE SAME" the entire content of which is incorporated by reference herein.

Sealed interior region 40 is preferably at least partially evacuated so that it has a vacuum pressure of less than one atmosphere (e.g., as low as $10^{-6}$ torr), which provides VIG window 10 with desirable thermal and acoustic insulation properties. In embodiments, edge seal 30 around the respective outer edges 28F and 28B of front and back glass panes 20F and 20B creates a hermetically sealed interior region 40 between surfaces 24F, 24B of front and back glass panes 20F and 20B.

Methods of making VIG window 10 of the present disclosure include irradiating glass pane 20B with laser radiation to form a plurality of glass-bump spacers 50 on surface 24B. Methods also include arranging surface 24B adjacent of glass pane 20B and substantially parallel to a surface 24F of glass pane 20F. In exemplary embodiments, surface 24F of glass pane 20F includes low emissivity layer 25. In other embodiments, glass bump spacers 50 on surface 24B contact low emissivity layer 25 on surface 24F when glass panes 20F and 20B are arranged according to the present methods. Methods of making VIG window 10 also include bonding glass pane 20F and 20B to create sealed interior region 40 between glass pane 20F and 20B by contacting low emissivity layer 25 with laser radiation having a predetermined wavelength. Contacting low emissivity coating 25 with laser radiation may include translating (i.e., moving) laser beam 102 across one of glass panes 20B or 20F to heat low emissivity layer 25. In exemplary embodiments, the glass bump spacers 50 on surface 24B contact low emissivity layer 25 on surface 24F within sealed interior region 40. Methods of forming VIG window 10 further include forming a vacuum pressure below atmospheric (e.g., $10^{-4}$ torr) within sealed interior region 40. Methods include pumping a gas from the sealed interior region 40 via a pump out tube along gap 28 or through one of glass panes 20F or 20B. Alternative methods and additional steps of forming double and triple pane VIG window 10 are provided in U.S. Pat. No. 8,679,599 the entire content of which is incorporated by reference herein.

FIG. 4A is a cross-sectional view similar to FIG. 2 and illustrates an example embodiment of a three-pane VIG window 10 that includes a middle glass pane 20M sandwiched between front pane 20F and back pane 20B. Middle glass pane 20M has a body portion 23M of a third glass material and has a front side 22M, a back side 24M and an edge 28M. Middle glass pane 20M may have the same or different thickness or material of construction, as glass panes 20F or 20B, or both. Middle glass pane 20M may undergo the same or different strengthening operation as glass panes 20F and 20B, or both.

First and second sets of glass-bump spacers 50 are respectively formed in both the front and back sides 22M and 24M of middle pane 20M and respectively serve to maintain distance DGA between middle glass pane 20M and front pane 20F, and distance DGB between the middle pane and back pane 20B. In this embodiment, surfaces 24F and 24B may contain low emissivity layer 25 to effectuate edge seals 30 or act as low friction coating at the contact location of glass-bump spacers 50, or both. In the example embodiment shown in FIG. 4A, multiple edge seals 30 are used, where one edge seal serves to seal at least respective portions of edges 28F and 28M, and the other edge seal serves to seal at least respective portions of edges 28M and 28B (see FIG. 4B). In another example embodiment, a single edge seal 30 serves to seal edges 28F, 28M and 28B.

Figure 4B:
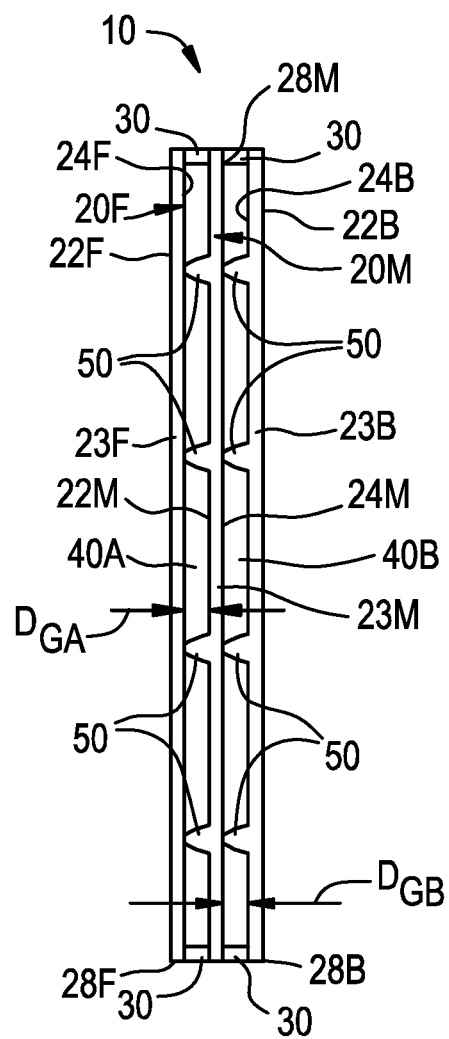
FIG. 4B is similar to FIG. 4A, except that the second set of glass-bump spacers are formed in the back glass pane rather than the middle glass pane.

FIG. 4B is similar to FIG. 4A, and illustrates an alternate example embodiment of a three-pane VIG window 10 FIG. 1 as viewed in the direction 1-1. In this embodiment, the second set of glass-bump spacers 50 are formed in inner surface 24B of back glass pane 20B rather than in the middle glass pane 20M. In this embodiment, surfaces 24F and 24M may contain low emissivity layer 25 to effectuate edge seals 30 or act as low friction coating at the contact location of glass-bump spacers 50, or both. FIG. 4B also illustrates an example embodiment where multiple edge seals 30 are used, as described above.

Figure 4C:
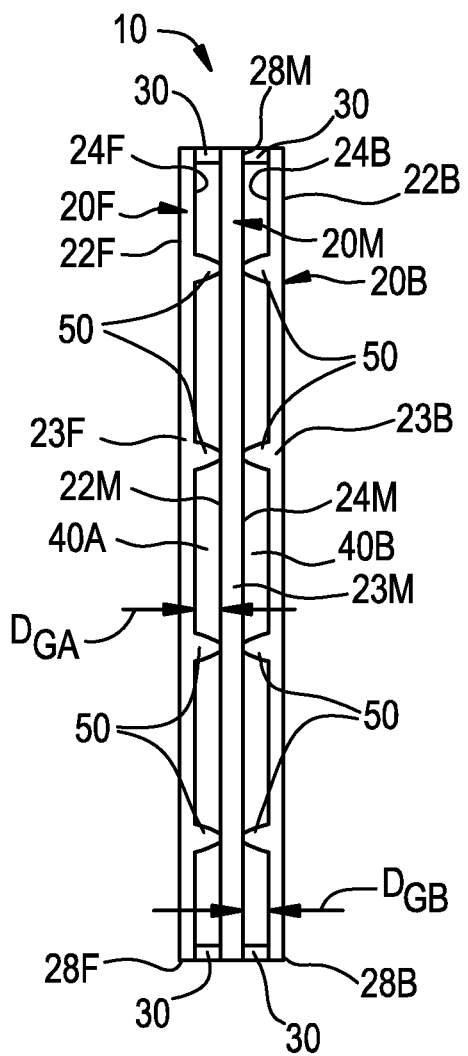
FIG. 4C is similar to FIG. 4A, except that the first and second sets of glass-bump spacers are formed in the front and back glass panes rather than the middle glass pane.
Figure 5A:
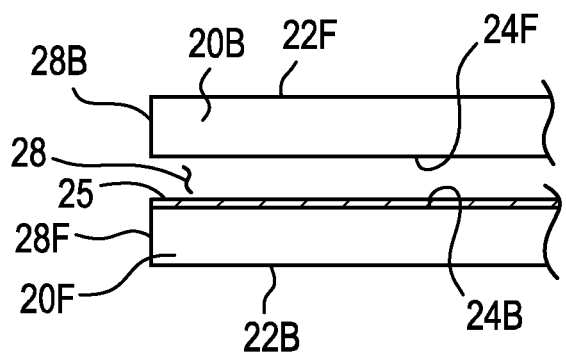
FIGS. 5A-D illustrate an exemplary procedure for laser welding using a low emissivity layer according to an exemplary embodiment.
Figure 5B:
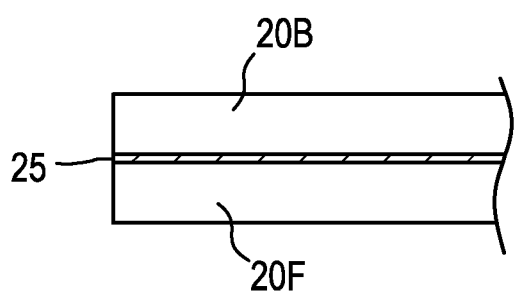
Figure 5C:
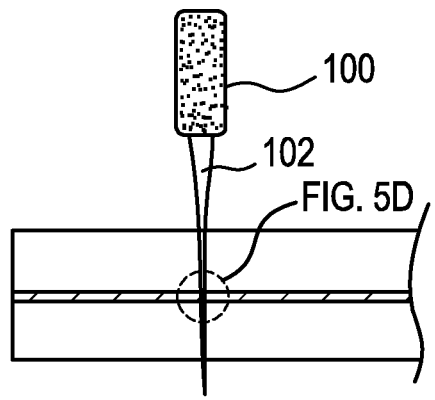
Figure 5D:
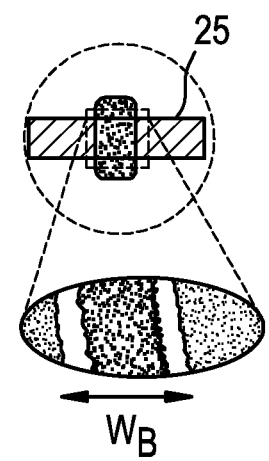

FIG. 4C is similar to FIG. 4B, and illustrates yet another alternate example embodiment of a three-pane VIG window 10, wherein the first set of glass-bump spacers 50 are formed in inner surface 24F of front glass pane 20F rather than in the middle glass pane 20M. In this embodiment, one or both surfaces of glass pane 20M (surfaces 22M and 24M) may contain low emissivity layer 25 to effectuate edge seals 30 or act as low friction coating at the contact location of glass-bump spacers 50, or both. Thus, in the embodiment illustrated in FIG. 4C, the glass-bump spacers are formed in the inner and outer panes, while in the embodiment illustrated in FIG. 4A, the glass-bump spacers are formed in the middle pane.

As disclosed in detail above, one or more low emissivity layers 25 can be formed over one or more surfaces of glass panes 20F, 20M, and 20B contacted by glass-bump spacers 50. For the sake of clarity, the low emissivity layers 25 have been omitted from the illustrated embodiments shown in FIGS. 1, 2 and 4A-C. Triple pane VIG window 10 embodiments provided in FIGS. 4A-C may be assembled similar and according to the methods described with respect to two pane VIG window 10 described above.

EXAMPLES

The present disclosure will be further clarified with reference to the following examples. The following examples are illustrative and should not be construed as limiting.

Two soda-lime glass (SLG) panes (61 cm long by 61 cm wide by 2.1 mm thick) by Pella® where purchased from Lowe's. One of the panes included Pella's Advanced low emissivity (low-e) coating for use in architectural applications on one of its surfaces. The other pane was just SLG without any coating. The two Pella® panes were cut into about ten 5 cm by 5 cm pieces for use in the following examples.

Example 1

Laser-Welding Using a Low Emissivity Coating

Figure 6:
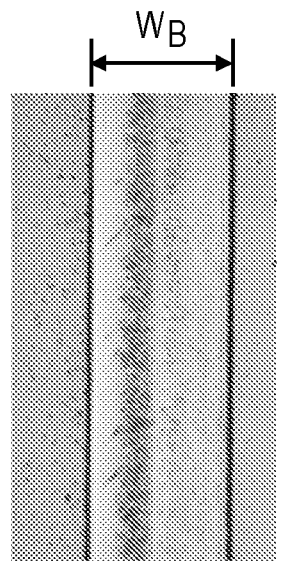
FIG. 6 is photograph of laser sealed glass panes with a low emissivity coating there between according to an exemplary embodiment.

One sample of each of the two panes where placed together with the low emissivity coating at the interface between and contacting the panes. A laser beam from a UV laser with a wavelength of 355 nm was provided substantially orthogonal to the interface between the two glass panes. The 3 watt laser beam was directed across the interface between the glass panes such that the beam spot diameter at the interface was about 100 microns. The laser beam was translated across the interface of the glass panes at 30 mm/sec. By absorbing the laser energy, the low emissivity coating was heated and bonded the two soda-lime glass panes together creating edge seal 30. A photograph of the bond between the two panes is provided in FIG. 6. The width $W_B$ of the bond in FIG. 6 is about 130 microns.

Figure 7:
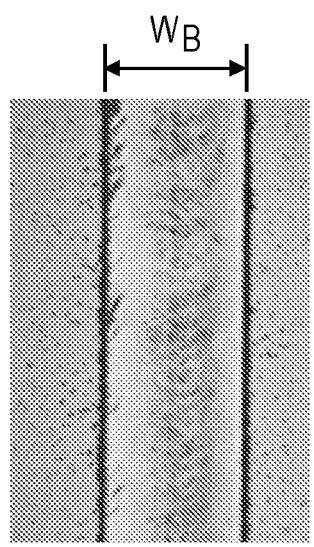
FIG. 7 is a photograph of laser sealed glass panes with a low emissivity coating there between according to an exemplary embodiment.
Figure 8:
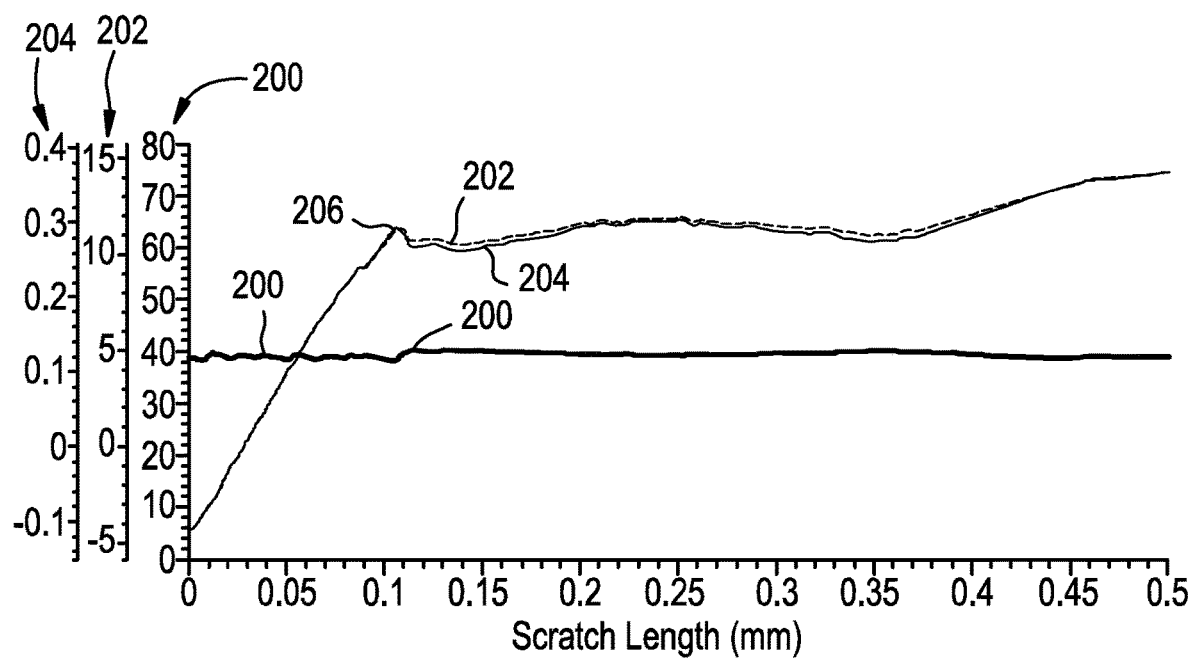
FIGS. 8-27 are force curves for a glass bump moving across a low emissivity layer in a simulated article according to exemplary embodiments.
Figure 9:
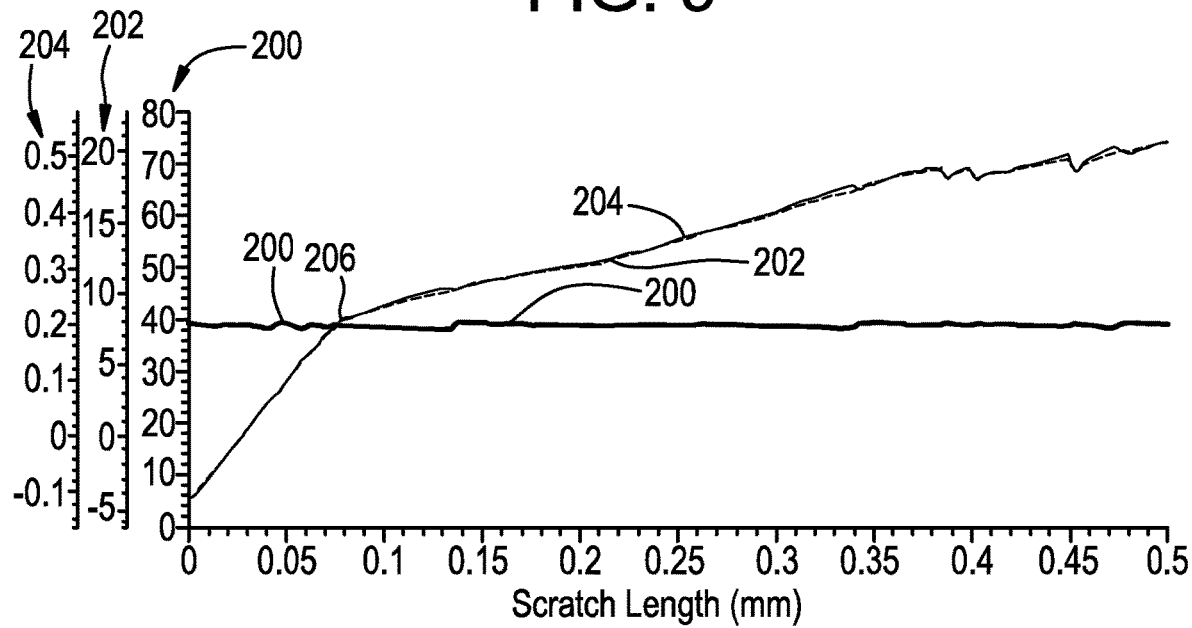
Figure 10:
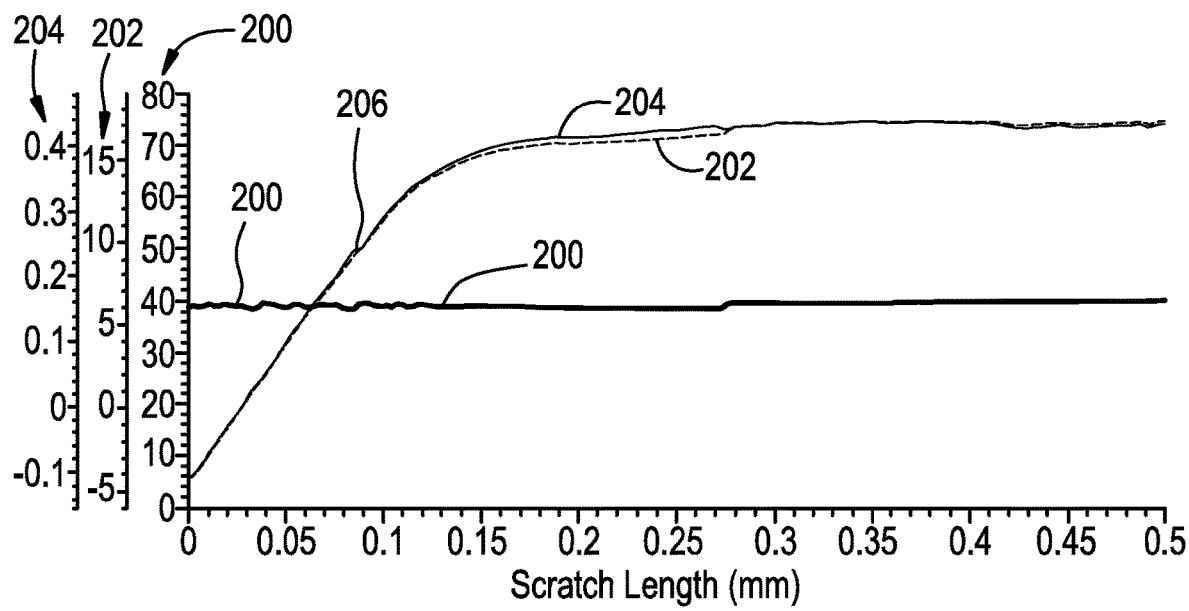
Figure 11:
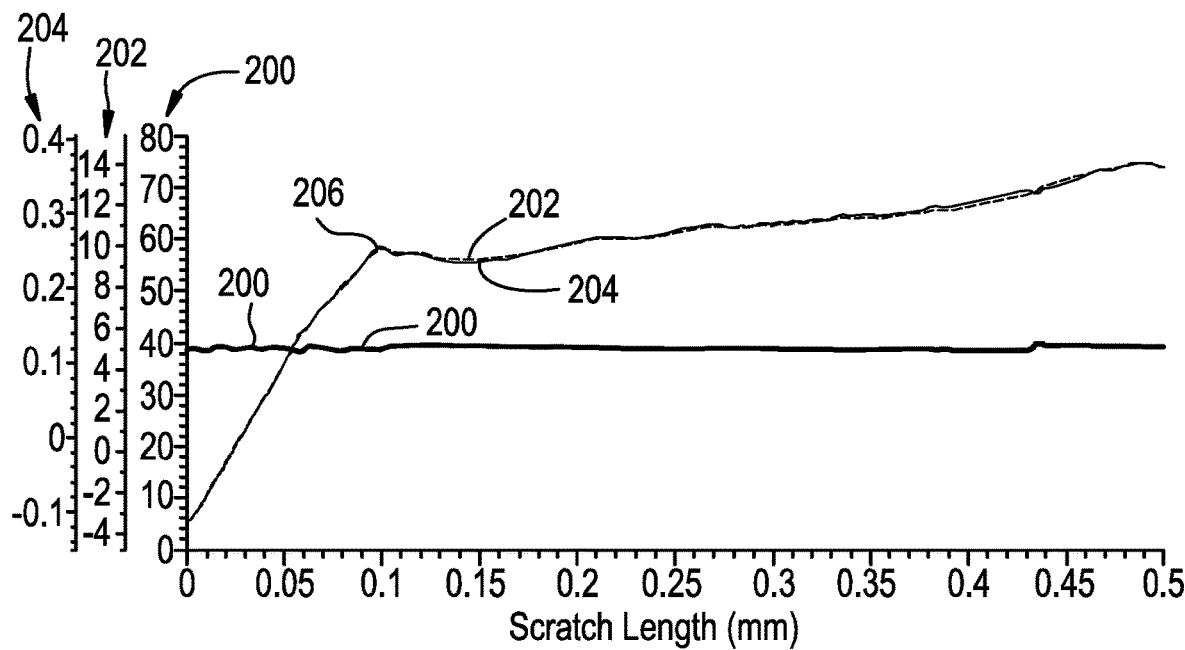
Figure 12:
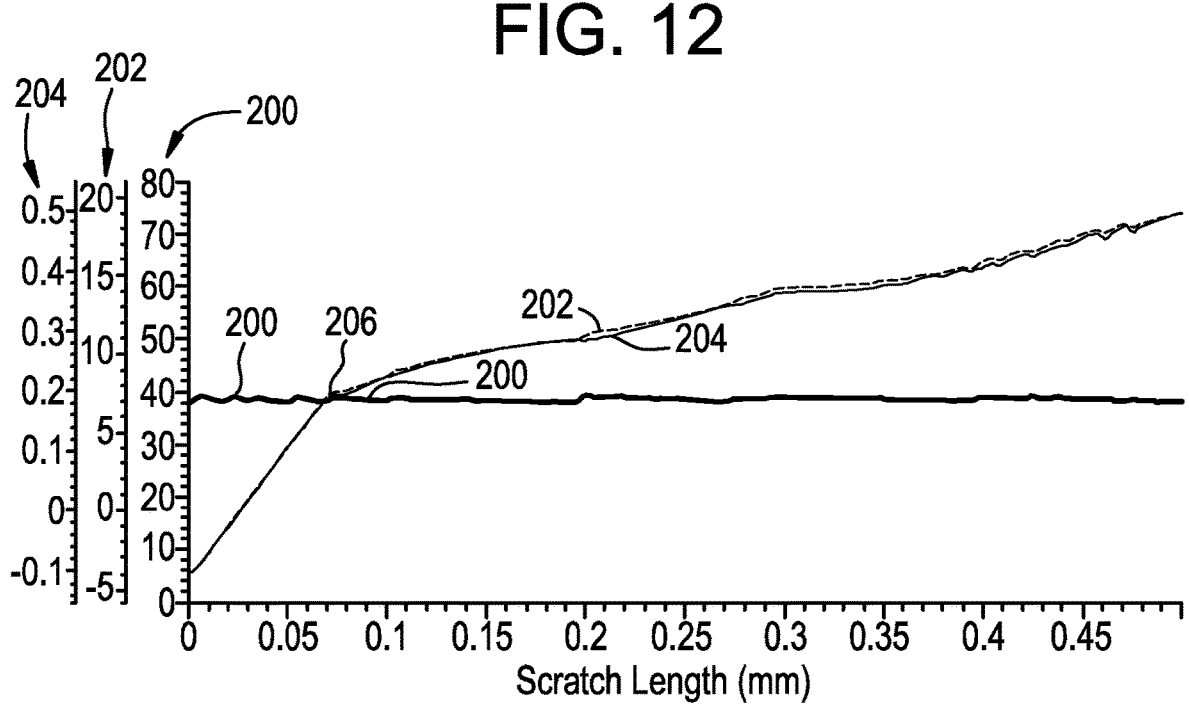
Figure 13:
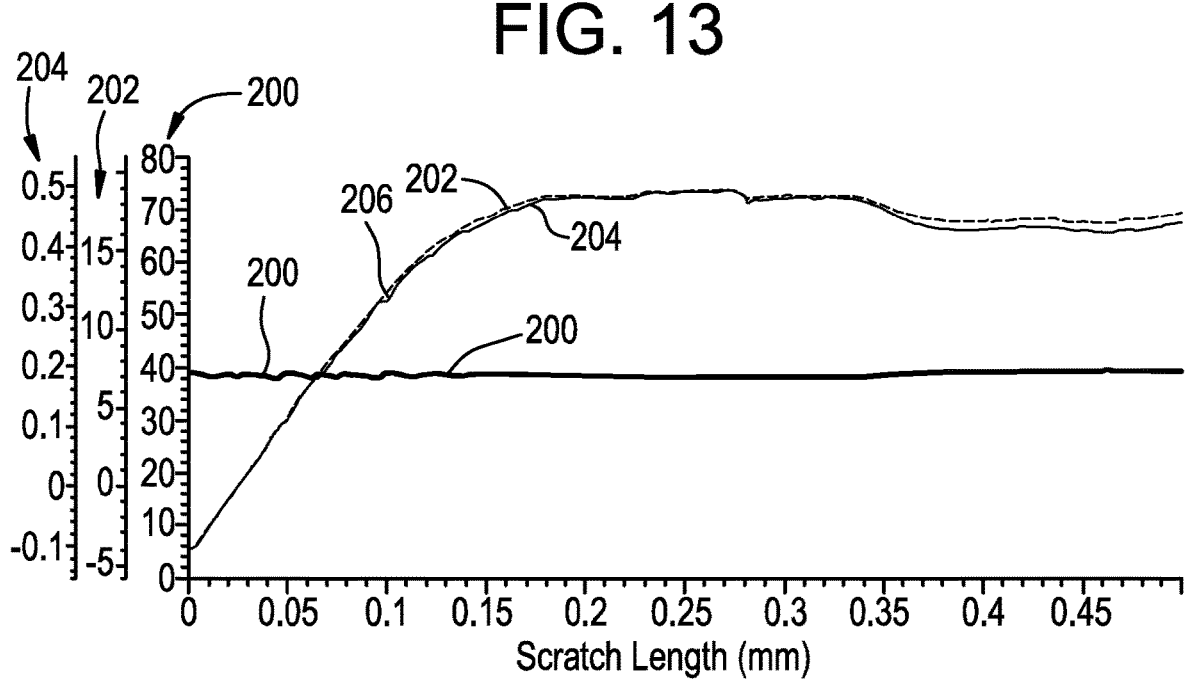
Figure 14:
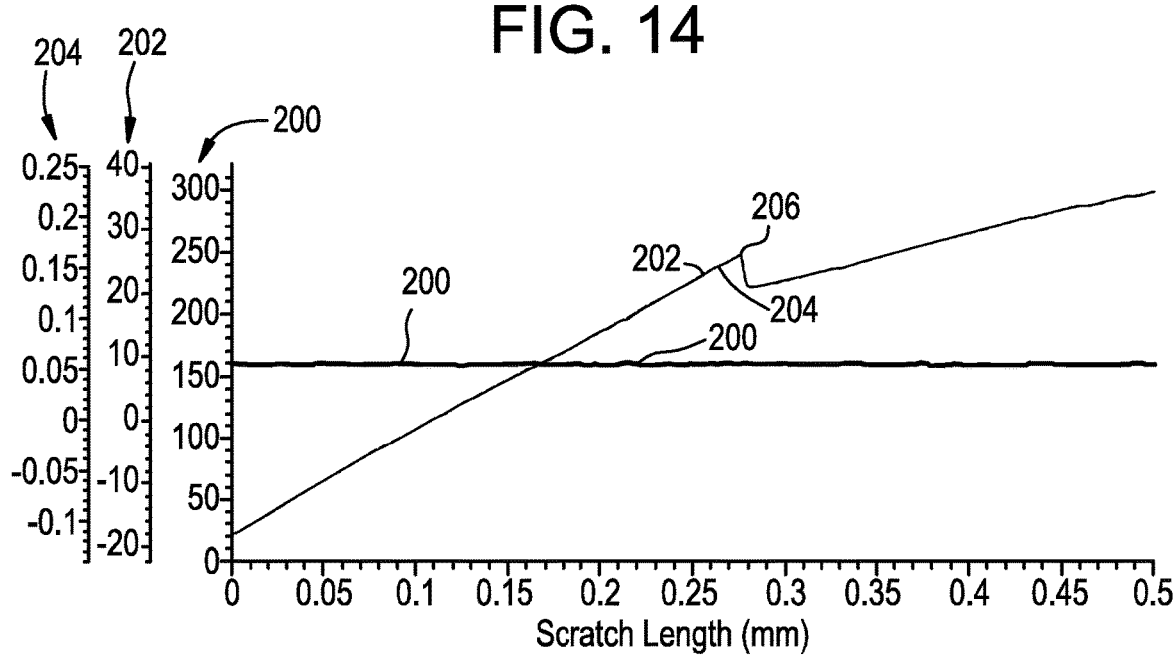
Figure 15:
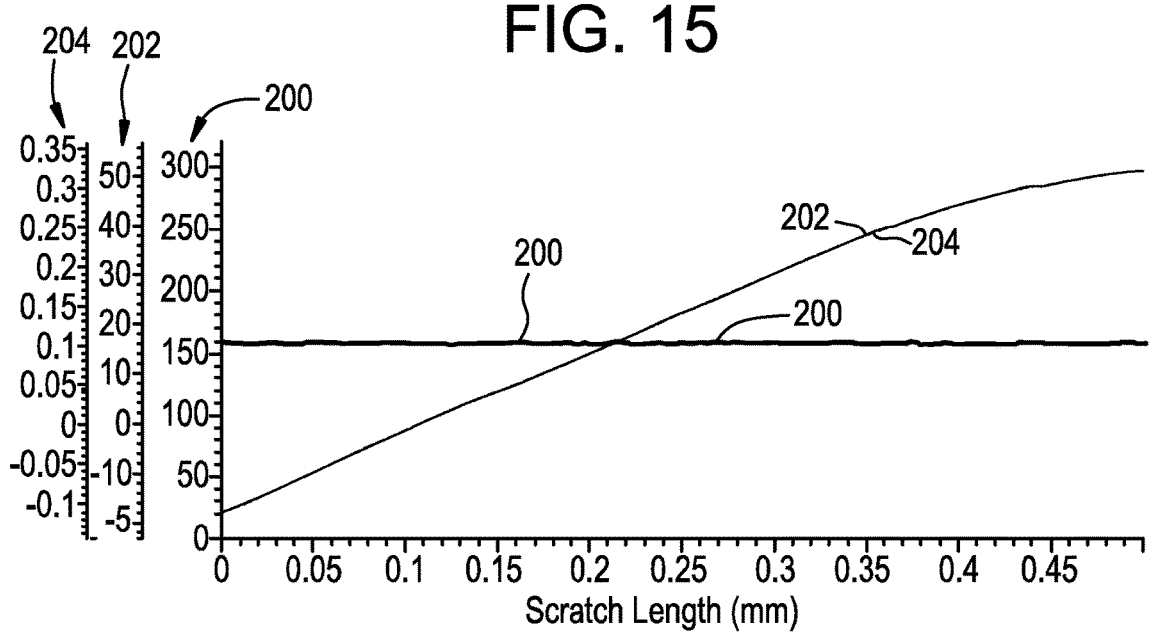
Figure 16:
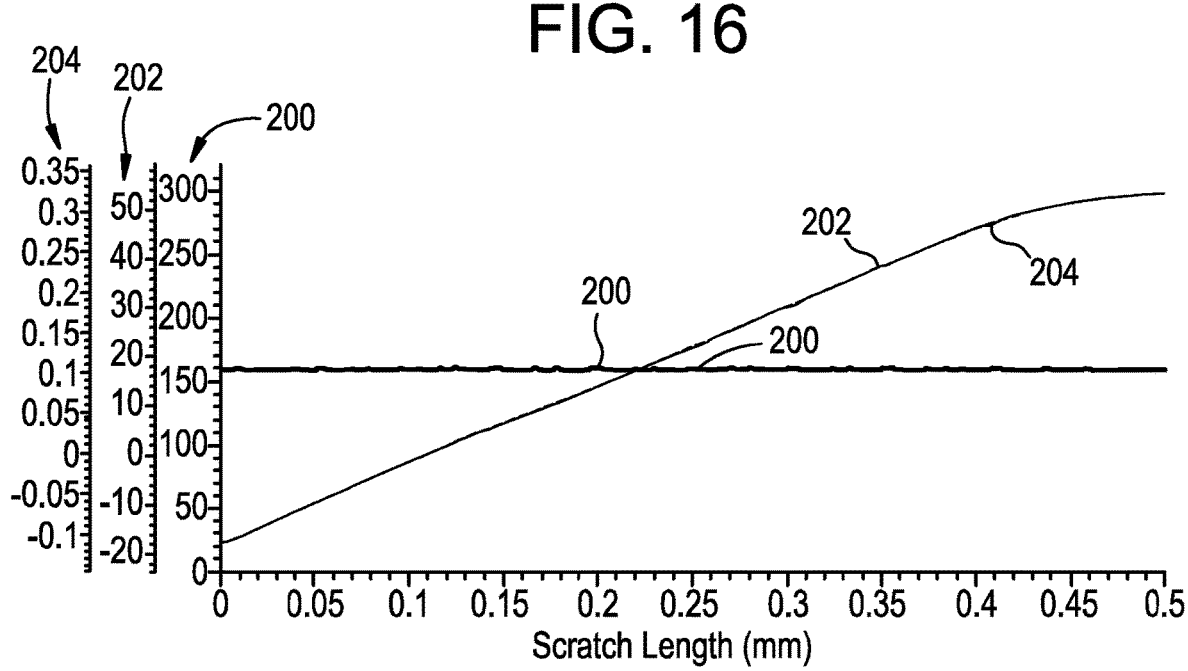
Figure 17:
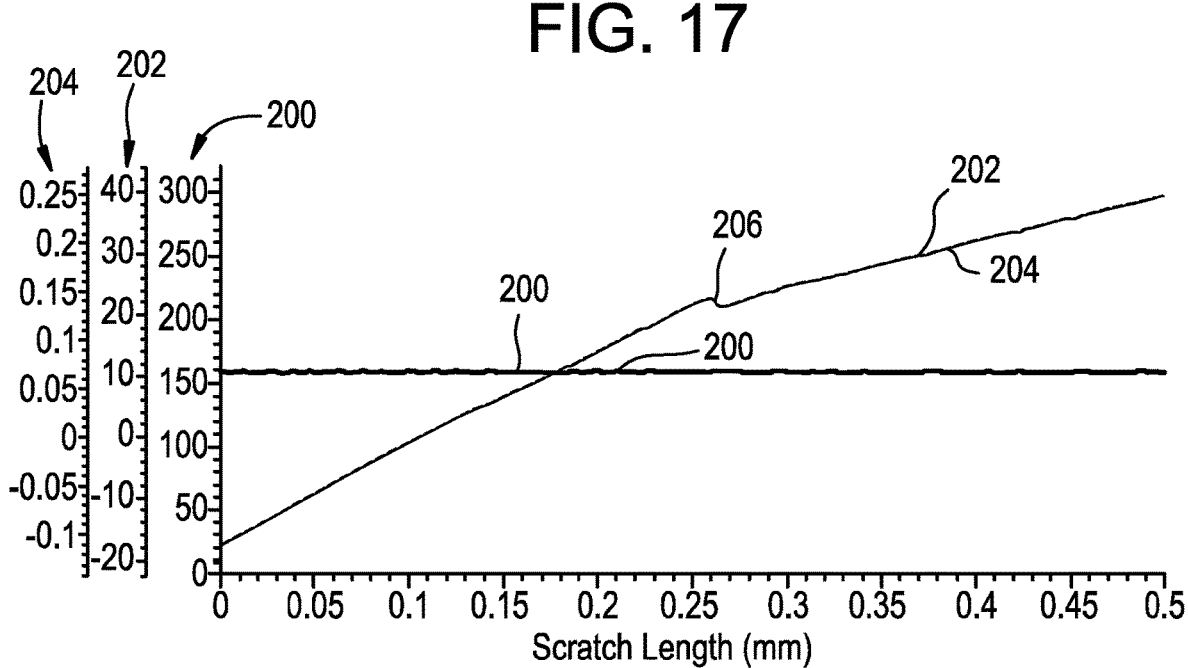
Figure 18:
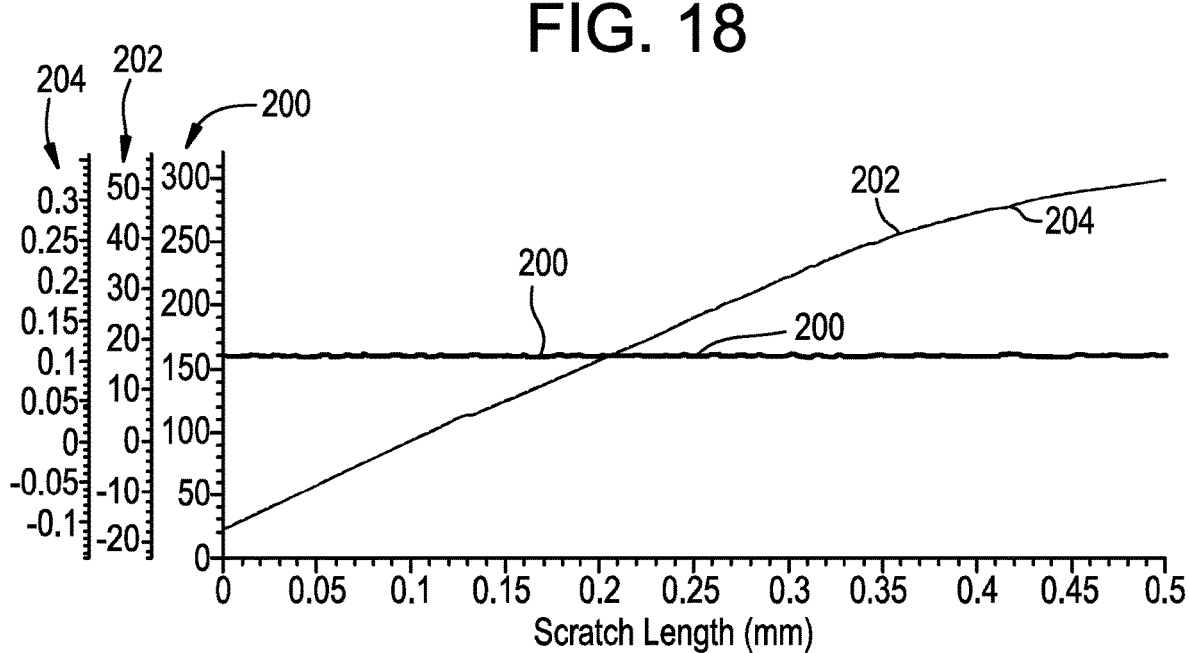
Figure 19:
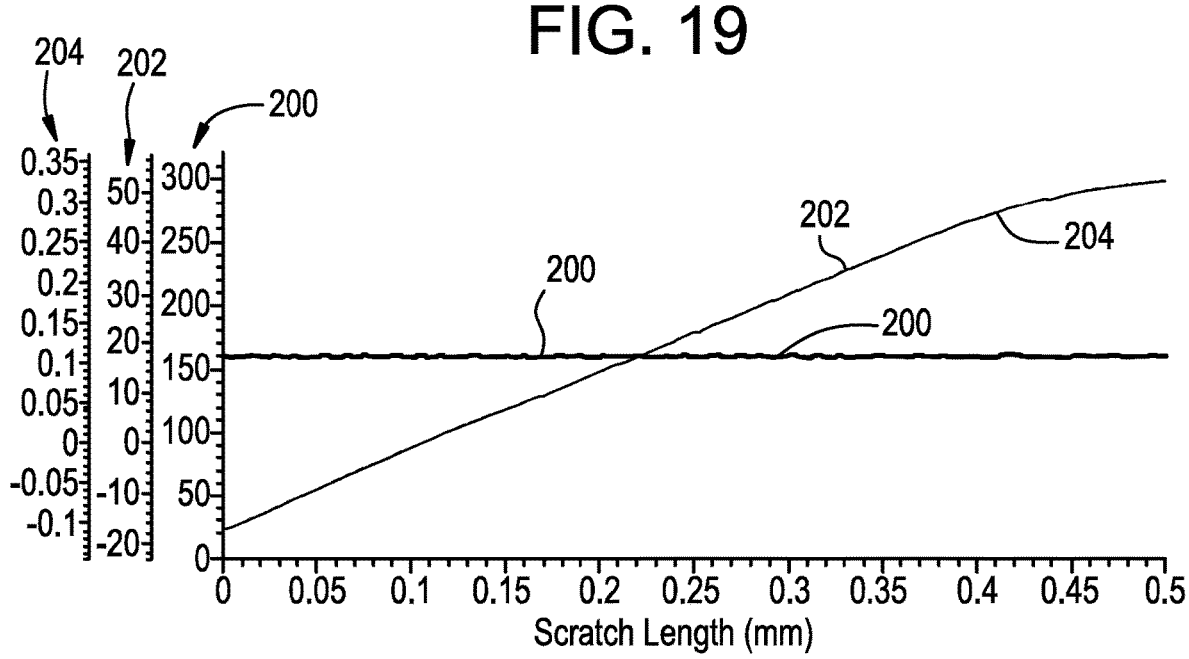
Figure 20:
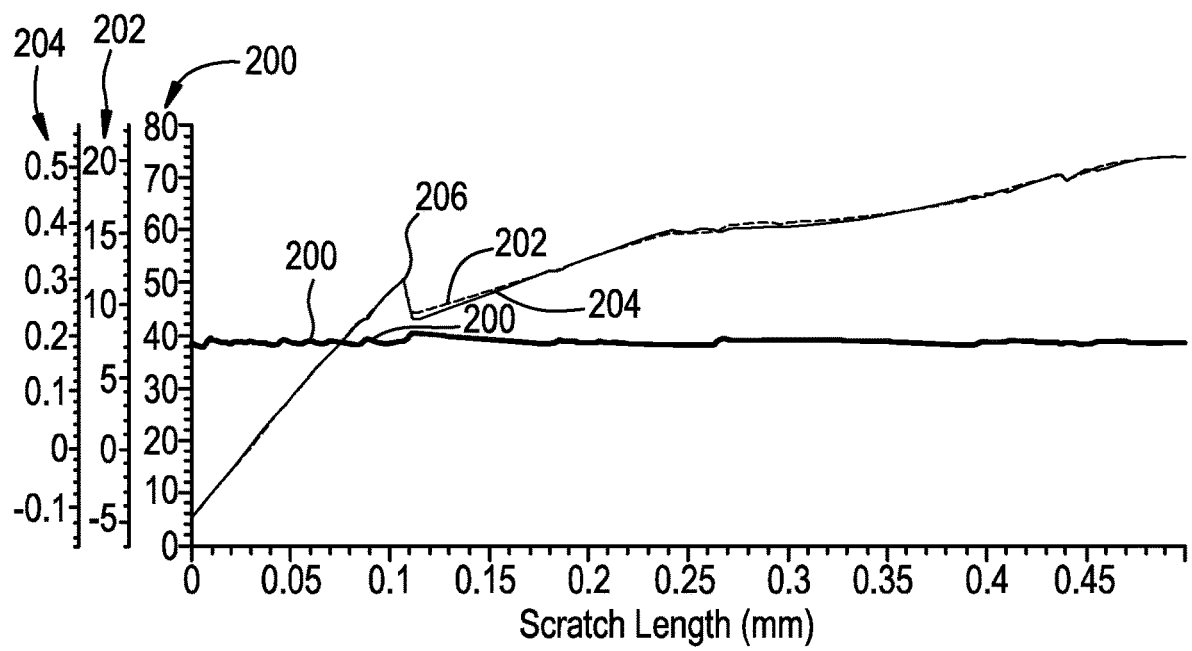
Figure 21:
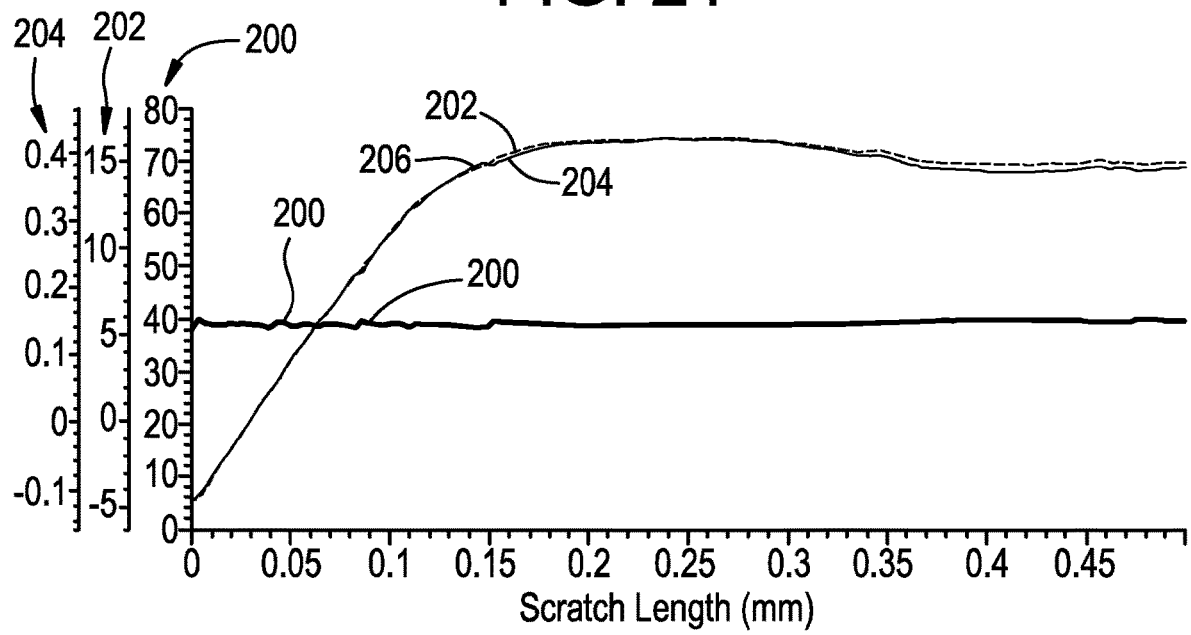
Figure 22:
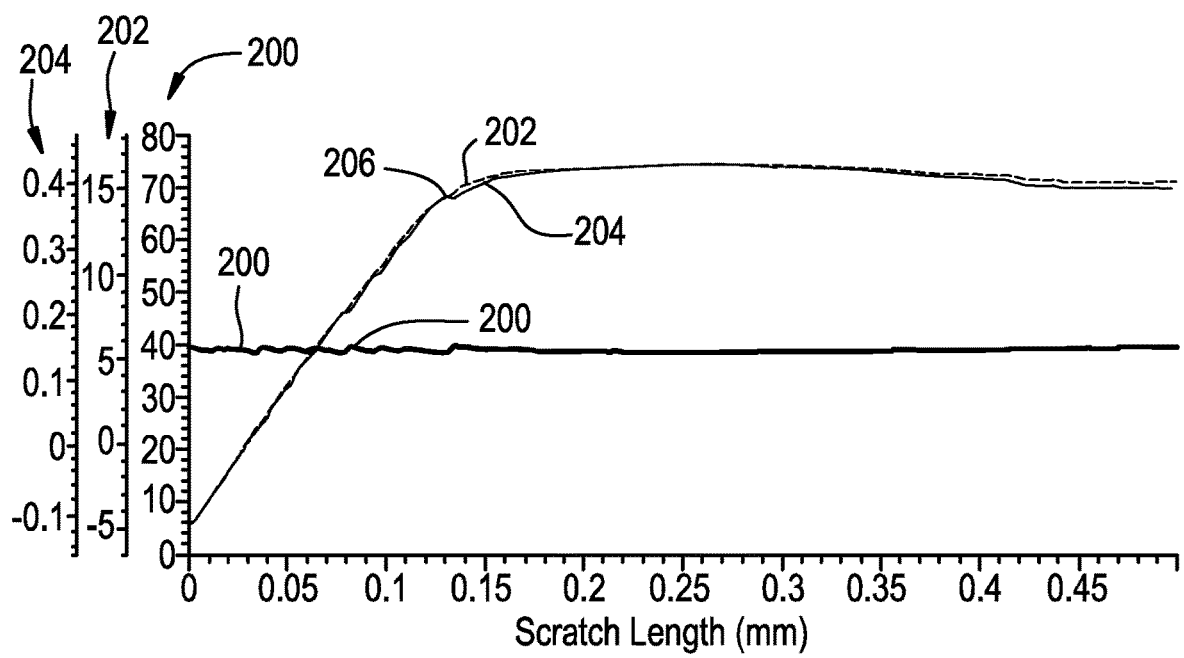
Figure 23:
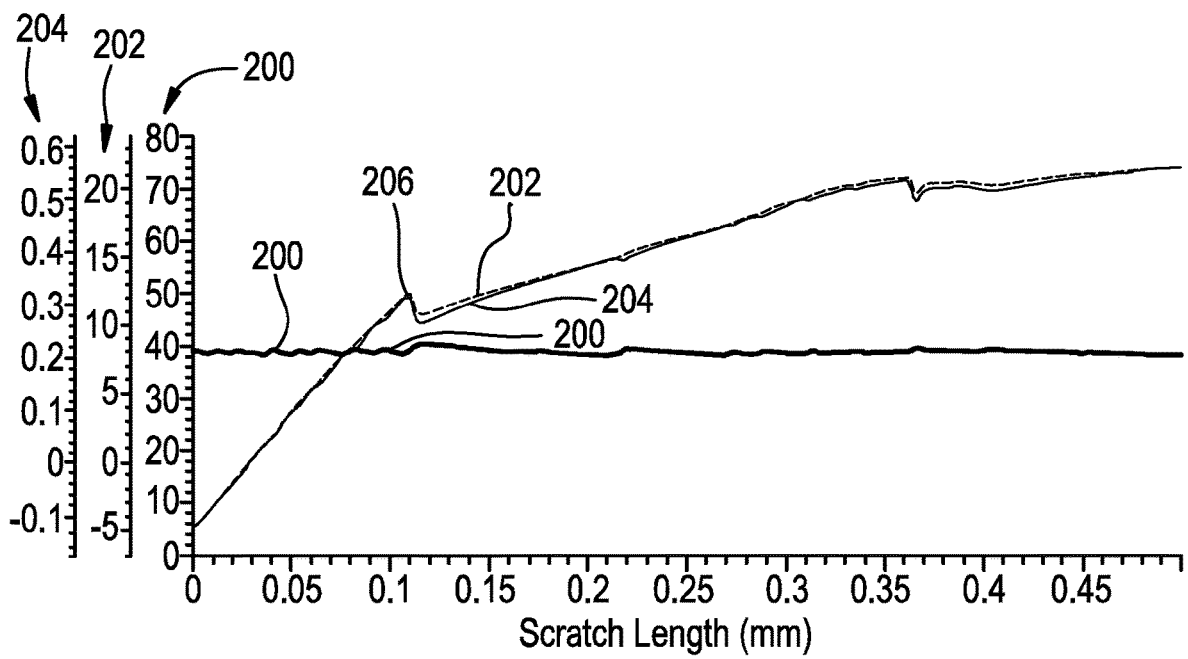
Figure 24:
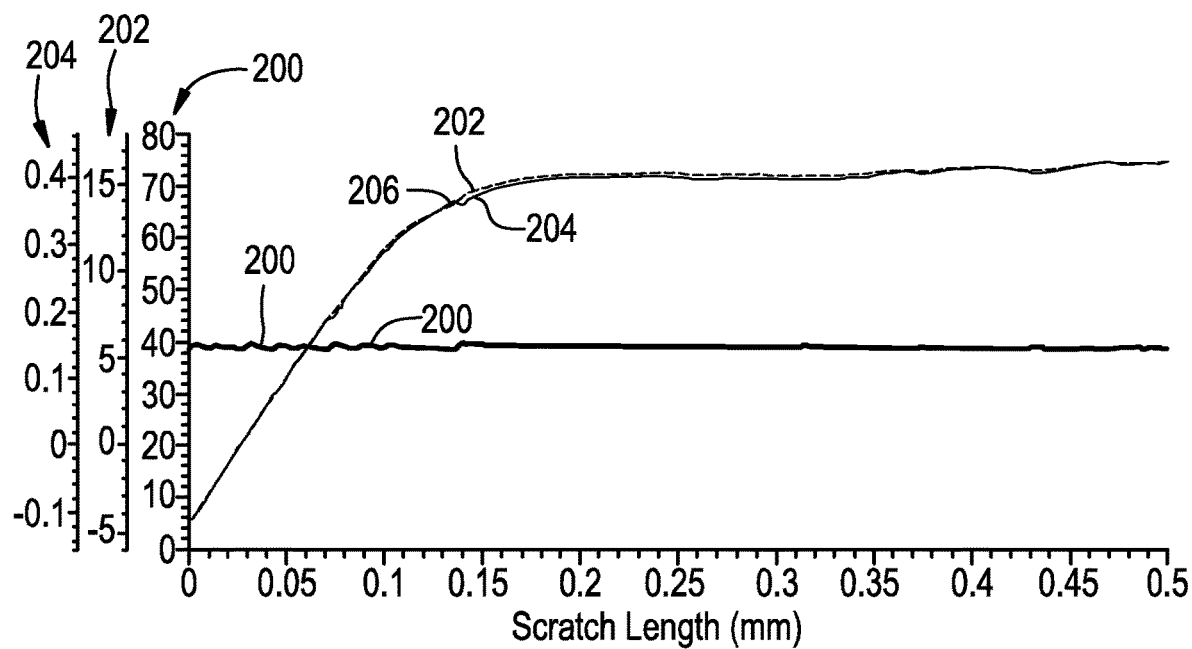
Figure 25:
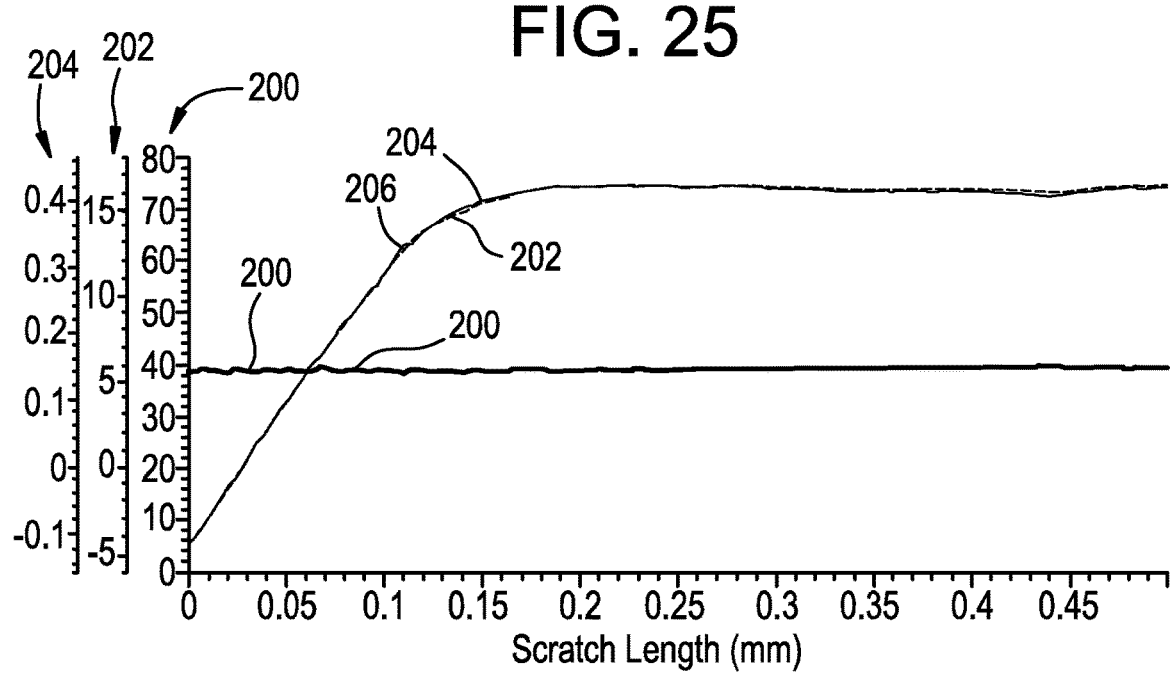
Figure 26:
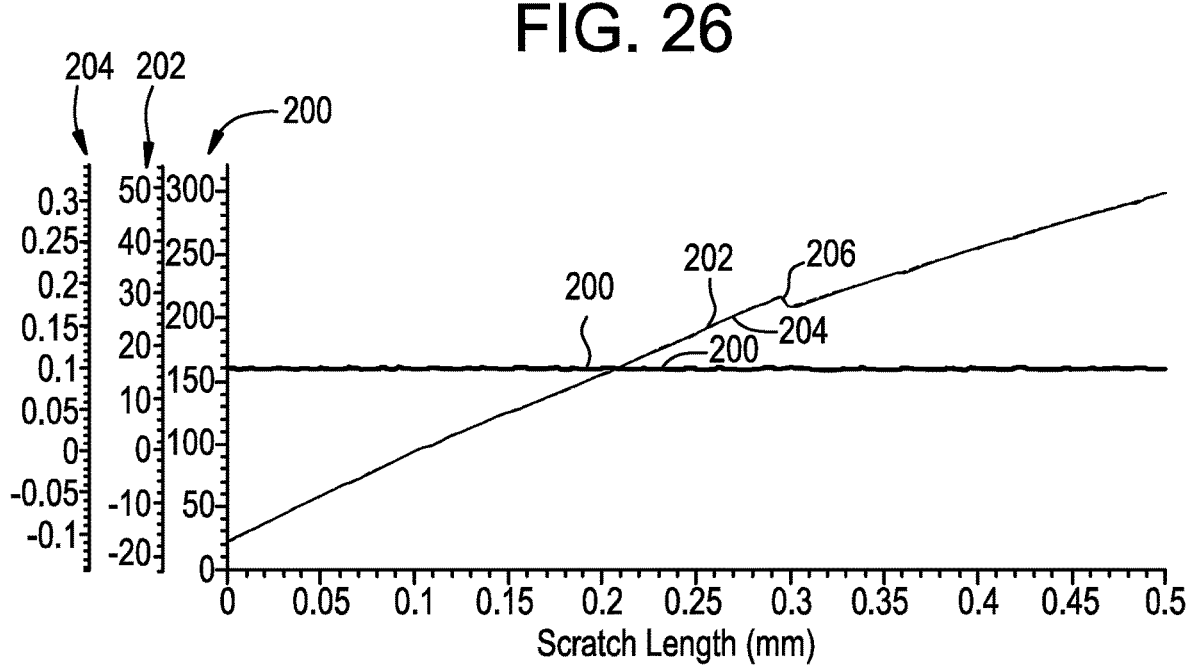
Figure 27:
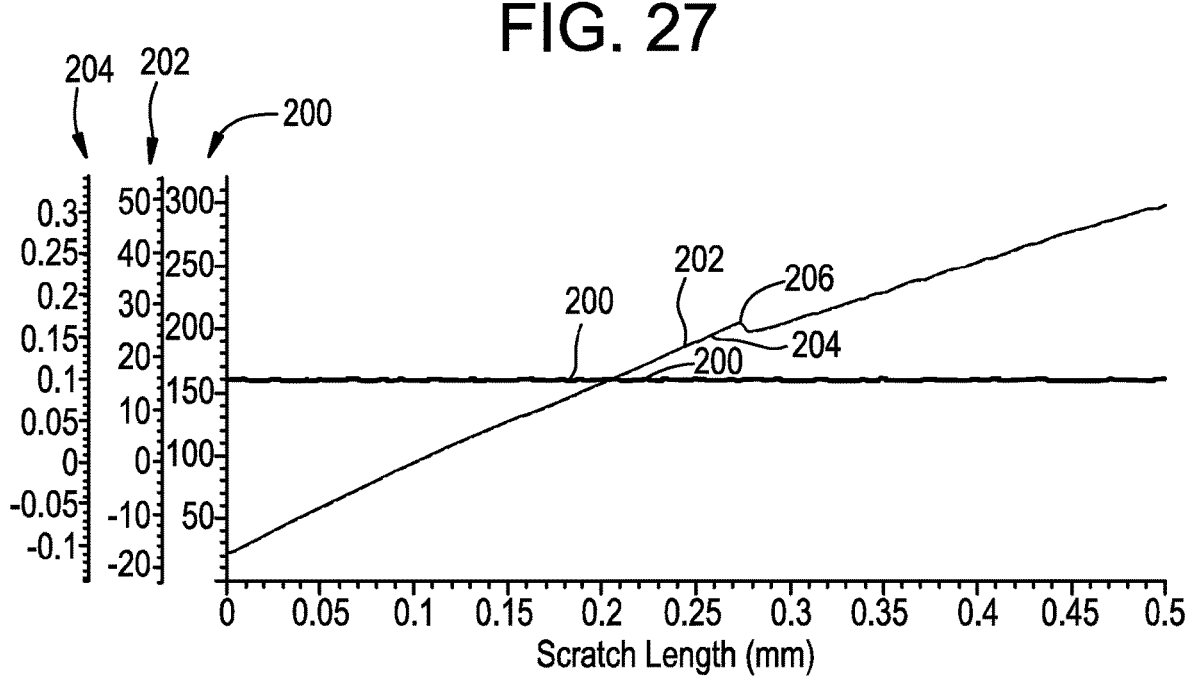

A second bond was created between the two soda-lime glass panes described above, in a similar operation as described above. However, the laser output was 4 watts with a translation rate across the interface at 60 mm/sec. A photograph of the bond between the two panes at this difference power output and translation is provided in FIG. 7. The width $W_B$ of the bond in FIG. 7 about 130 microns.

Example 2

Low Emissivity Coating as Low Frictive Coating

For the following 8 tests, one of each of the two panes described above (one SLG pane and one SLG pane with a low-e coating on one surface) was used. That is, eight pairs of glass panes (one of each pair with a low-e coating) were prepared as follows. A glass-bump spacer was formed by laser-induction on each of the 8 SLG glass panes (i.e., the panes without the low-e coating). Specifically, the 355 nm wavelength laser beam at 15 watts, was focused through and behind each of the glass panes to create a glass-bump spacer with a height of 150 microns and a diameter of 600 microns. Each glass bump was plasma cleaned (i.e., via ionized gas bombardment) at 380° C. for about 3 hours to remove contaminates (e.g., particles) from the glass bump surface. Half of the 8 SLG panes with low-e coating were heat treated first at 380° C. for about 3 hours to simulate heating of a VIG window during organic removal and second at 410° C. for about 30 minutes to simulate frit edge sealing of a VIG window. The other 4 SLG panes with low-e coating were not heat treated before testing.

The 8 SLG panes with glass bumps were then paired with the other 8 SLG with low-e coatings, the glass bump contacting the low-e coating surface. Each pair of glass panes was placed in a Nanovea M1 Mechanical Tester (the "Tester") to simulate 40N and 160N loads (i.e., normal force) in a VIG window on the glass bump contacting the low-e coating. Keeping the load the same for each of the 8 tests, each glass bump was moved at 1.0 mm/min across 0.5 mm of the low-e coating while the Tester measured the normal force load ($F_N$) in newtons (N) and frictional force ($F_F$) in newtons (N) to calculate the coefficient of friction (CoF). The bump was then brought back 0.5 mm to its original position and the test was repeated twice more over the same area as the first pass to simulate linear thermal expansion and contraction in a VIG window.

Figure 28:
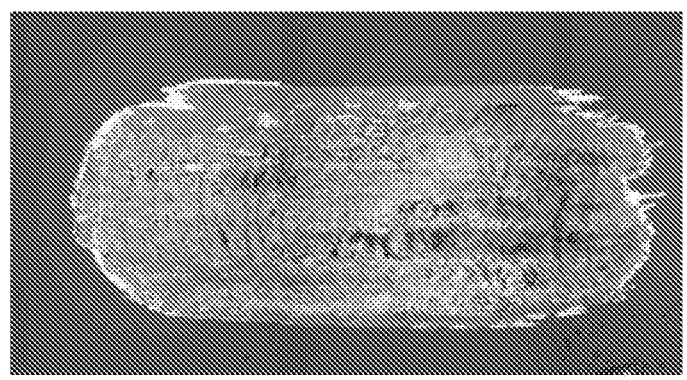
FIGS. 28-29 are wear patterns on a low emissivity layer from a glass bump moving there across according to exemplary embodiments.
Figure 29:
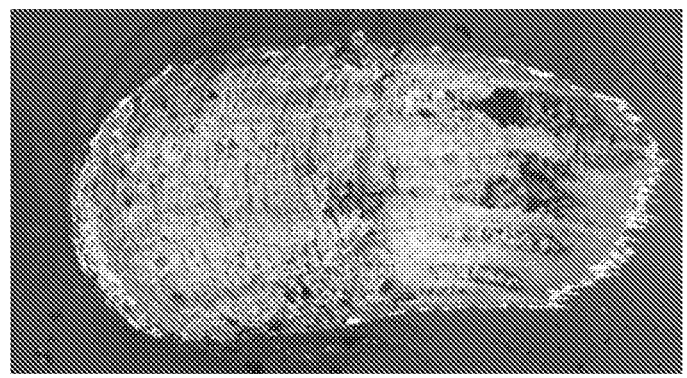

Table 1 below provides the average (Ave.) $F_N$ load provided in each test and the resultant CoF between the glass bump and the low-e coating for each of the three passes. The force curves for each of the 3 glass bump passes (all 3 passes measured in the same forth direction) are provided in FIGS. 8-27. Movement of the glass bump back to its original position was not measured. The applicable figures for each test based on the pass are provided in Table 1 below. In each of FIGS. 8-27, the $F_N$ load line and applicable y-axis measurement (N) are marked 200 (bolded, solid line), the $F_F$ load line and applicable y-axis measurement (N) are marked 202 (dashed line), and the CoF line and applicable y-axis measurement (unitless) is marked as 204 (solid line). In many places in FIGS. 8-27 the dashed line 202 and solid line 204 overlap. The x-axis of FIGS. 8-27 is the scratch length (mm). If not indeterminate (indet.), the static CoF point is marked 206 in each of FIGS. 8-27. FIG. 28 is a photograph of the wear pattern on the low-e coating from Test 1 after three passes there over by the glass-bump spacer at $F_N$=40 N. FIG. 29 is a photograph of the moderate wear pattern on the low-e coating from Test 4 after three passes there over by the glass-bump spacer at $F_N$=160 N.

TABLE 1

Testing Parameters and Results for Example 2

| Test | SLG w/ Low-e Treatment | Ave. $F_N$ Load (N) | Pass 1 Static COF | Pass 1 Force Curves | Pass 2 Static COF | Pass 2 Force Curves | Pass 3 Static COF | Pass 3 Force Curves |
|---|---|---|---|---|---|---|---|---|
| 1 | None | 40 | 0.3 | FIG. 8 | 0.2 | FIG. 9 | 0.25 | FIG. 10 |
| 2 |  | 40 | 0.25 | FIG. 11 | 0.2 | FIG. 12 | 0.3 | FIG. 13 |
| 3 |  | 160 | 0.17 | FIG. 14 | Indet. | FIG. 15 | Indet. | FIG. 16 |
| 4 |  | 160 | 0.14 | FIG. 17 | Indet. | FIG. 18 | Indet. | FIG. 19 |
| 5 | 3 hr. at | 40 | 0.3 | FIG. 20 | 0.42 | FIG. 21 | 0.38 | FIG. 22 |
| 6 | 380° C. | 40 | 0.32 | FIG. 23 | 0.32 | FIG. 24 | 0.32 | FIG. 25 |
| 7 | and ½ hr. at 410° C. | 160 | 0.18 | FIG. 26 | Glass-bump was crushed | N/A | Glass-bump was crushed | N/A |
| 8 |  | 160 | 0.16 | FIG. 27 | Glass-bump was crushed | N/A | Glass-bump was crushed | N/A |

The CoF for each test in Table 1 above provides that the low-e coating reduces the CoF due to lateral movement between the glass bumps and opposing glass pane from about 0.8-1 to about 0.2-0.4.

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

What is claimed is:

1. A sealed article comprising:
   a first glass pane comprising a first glass material, a first inner surface opposite a first outer surface, and a first outer edge;
   a second glass pane comprising a second glass material, a second inner surface opposite a second outer surface, and a second outer edge;
   the second glass pane spaced apart from and positioned substantially parallel to the first glass pane such that the first and second inner surfaces face each other;
   a low emissivity layer on the inner surface of the first or second glass pane; and
   a laser-induced edge seal contiguous the low emissivity layer connects at least part of the first and second inner surfaces so as to define a sealed interior region between the first and second glass panes.

2. The article of claim 1 wherein the edge seal is a laser-induced bond formed by absorption of at least 30% of laser radiation having a wavelength predetermined by the low emissivity layer.

3. The article of claim 2 wherein the predetermined wavelength of the laser radiation is between 100 nm and 400 nm.

4. The article of claim 2 wherein the laser-induced bond has a width from about 10 microns to about 1,000 microns.

5. The article of claim 1 wherein the first glass pane, the second glass pane, and the low emissivity layer are transmissive at 420 nm to 750 nm.

6. The article of claim 1 wherein the low emissivity coating has a thickness from about 50 nm to about 500 nm.

7. The article of claim 1 further comprising a plurality of glass-bumps formed on the inner surface of the first glass pane or the second glass pane, the low emissivity layer between the plurality of glass-bumps and the opposite inner surface.

8. The article of claim 7 wherein the low emissivity layer reduces friction between the plurality of glass-bumps and the opposite inner surface; and
   a static coefficient of friction between the low emissivity layer and one of the plurality of glass-bumps ranges from about 0.1 to about 0.4 for a load of 1 N to 200 N on one of the plurality of glass-bumps, the load substantially orthogonal to the first inside surface.

9. The article of claim 1 wherein the edge seal creates a sealed interior region between the inner surfaces of the first and second glass panes.

10. A vacuum insulated glass (VIG) window comprising:
    a first glass pane comprising a first glass material, a first inner surface opposite a first outer surface, and a first outer edge;
    a second glass pane comprising a second glass material, a second inner surface opposite a second outer surface, and a second outer edge;
    the second glass pane spaced apart from and positioned substantially parallel to the first glass pane;
    a low emissivity coating on the second inner surface of the second glass pane;
    a plurality of glass-bumps formed from the first glass material on the first inner surface of the first glass pane;
    a laser-induced edge seal contiguous the low emissivity layer formed around at least respective portions of the first and second inner surfaces so as to define a sealed interior region between the first and second glass panes; and wherein the plurality of laser-formed glass-bumps on the first inner surface of the first glass pane contact the low emissivity coating on the second inner surface of the second glass pane.

11. The window of claim 10 wherein the low emissivity coating includes and inorganic layer selected from the group consisting of $SiO_2$, $Al_2O_3$, ZnO, $TiO_2$, $SnO_2$, and combinations thereof.

12. The window of claim 10 wherein the low emissivity coating includes a metal layer selected from the group consisting of gold, silver, copper, and combinations thereof.

13. The window of claim 10 wherein a top layer of the low emissivity coating opposite the first inner surface of the first glass pane comprises $SiO_2$, $Al_2O_3$, or combinations thereof.

14. The window of claim 10 wherein the low emissivity coating reflects sunlight having a wavelength between 701 nm and 2,000 nm.

15. The window of claim 10 wherein a static coefficient of friction between the low emissivity coating and one of the plurality of glass-bumps ranges from 0.1 to 0.4 for a load of 40 N to 160 N on one of the plurality of glass-bumps, the load substantially orthogonal to the first inside surface.

16. The window of claim 10 wherein the first glass pane, the second glass pane, and the low emissivity coating have a combined transmission of up to 70% at wavelengths from about 450 nm to about 625 nm.

17. The window of claim 10 wherein the plurality of glass-bumps have a height from about 80 microns to about 300 microns.

* * * * *

UNITED STATES PATENT AND TRADEMARK OFFICE
CERTIFICATE OF CORRECTION

| | | |
|---|---|---|
| PATENT NO. | : 10,954,160 B2 | Page 1 of 1 |
| APPLICATION NO. | : 15/780109 | |
| DATED | : March 23, 2021 | |
| INVENTOR(S) | : Alexander Mikhailovich Streltsov et al. | |

It is certified that error appears in the above-identified patent and that said Letters Patent is hereby corrected as shown below:

In the Specification

In Column 1, Line 12, delete "by," and insert -- by --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*